US011086161B2

(12) United States Patent
 Richards et al.

(10) Patent No.: US 11,086,161 B2
(45) Date of Patent: Aug. 10, 2021

(54) ACTIVE ALIGNMENT OF PANCAKE LENS BASED DISPLAY ASSEMBLIES

(71) Applicant: Facebook Technologies, LLC, Menlo Park, CA (US)

(72) Inventors: Evan M. Richards, Fremont, CA (US); Hannah D. Noble, Sunnyvale, CA (US); Mark Alan Tempel, Issaquah, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 51 days.

(21) Appl. No.: 16/535,017

(22) Filed: Aug. 7, 2019

(65) Prior Publication Data

US 2020/0096817 A1   Mar. 26, 2020

Related U.S. Application Data

(60) Provisional application No. 62/737,020, filed on Sep. 26, 2018.

(51) Int. Cl.
  *G02B 27/01*   (2006.01)
  *G02B 27/28*   (2006.01)
  *G02F 1/1335*  (2006.01)

(52) U.S. Cl.
  CPC ... *G02F 1/133528* (2013.01); *G02B 27/0179* (2013.01); *G02F 1/133541* (2021.01)

(58) Field of Classification Search
  CPC ........ G02B 27/00; G02B 27/01; G02B 27/02; G02B 27/09; G02B 27/12; G02B 27/14;
  (Continued)

(56) References Cited

U.S. PATENT DOCUMENTS

2007/0070508 A1* 3/2007 Ruhle ............... G02B 27/0172
                                                      359/630
2015/0378074 A1* 12/2015 Kollin ................ G02B 5/3016
                                                      349/185

(Continued)

FOREIGN PATENT DOCUMENTS

WO    WO 02/03122 A1    1/2002

OTHER PUBLICATIONS

PCT International Search Report and Written Opinion, PCT Application No. PCT/US2019/052363, dated Dec. 5, 2019, nine pages.

*Primary Examiner* — Chanh D Nguyen
*Assistant Examiner* — Nguyen H Truong
(74) *Attorney, Agent, or Firm* — Fenwick & West LLP

(57) ABSTRACT

A display assembly of a head mounted display (HMD) includes a pancake lens display assembly. The pancake display assembly comprises a first lens with a quarter-waveplate and a partially reflective surface, a second lens with a reflective polarizer, and a display. An alignment system positions the first lens relative to the second lens to align the reflective polarizer of the second lens with the quarter-waveplate of the first lens. The alignment system rotates the first lens about an optical axis to position the quarter-waveplate on the first lens such that the quarter-waveplate and the reflective polarizer on the second lens are at an angle where light transmitted through the second lens and then through the first lens is substantially circularly polarized. The alignment system mounts the second lens to the lens housing such that the quarter-waveplate is at the angle relative to the reflective polarizer.

20 Claims, 12 Drawing Sheets

(58) Field of Classification Search
CPC ........ G02B 27/26; G02B 27/28; G02B 27/30; G02B 5/04; G02B 5/18; G02B 5/30; G02B 5/32; G02F 1/13; G02F 1/1335; G02F 1/1343
See application file for complete search history.

(56) References Cited

U.S. PATENT DOCUMENTS

| | | | |
|---|---|---|---|
| 2016/0216540 A1* | 7/2016 | Cho | G02F 1/133536 |
| 2017/0068096 A1* | 3/2017 | Ouderkirk | G02B 27/0068 |
| 2018/0039052 A1 | 2/2018 | Khan et al. | |
| 2018/0197503 A1 | 7/2018 | Sasaki et al. | |

* cited by examiner

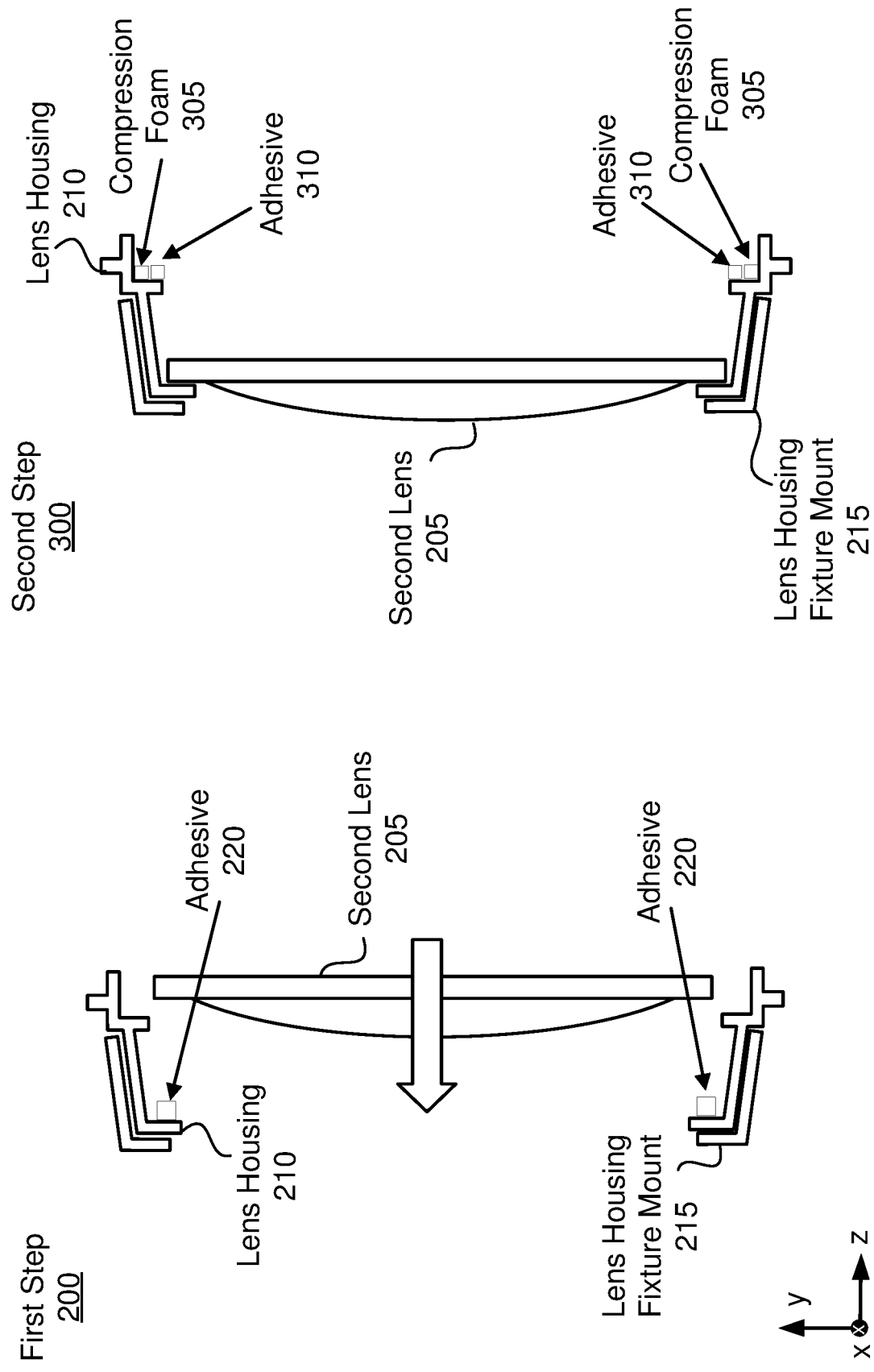

950

```
Mount a second lens of a pancake lens display assembly to a lens housing
955
          ↓
Position a first lens in optical series with the second lens
960
          ↓
Direct light from an illumination source through the second lens and then the
first lens to a circular polarimeter
965
          ↓
Rotate the first lens through a range of angles along optical axis
970
          ↓
Determine an angle where an amount of circular polarized light received at the
circular polarimeter is below a threshold value using the circular polarimeter
975
          ↓
Mount the first lens to the lens housing at the determined angle
980
          ↓
Mount a display to a display housing
985
          ↓
Mount and align the display housing to the lens housing via adjustment screws
990
```

FIG. 9B ly recognize from the following description that alternative embodiments of the structures and methods illustrated

ACTIVE ALIGNMENT OF PANCAKE LENS BASED DISPLAY ASSEMBLIES

This application claims the benefit of U.S. Provisional Application No. 62/737,020, filed Sep. 26, 2018, which is incorporated by reference in its entirety.

BACKGROUND

The present disclosure generally relates to aligning optics of a pancake lens display assembly, and in particular to active alignment of pancake lens based display assemblies.

In conventional configurations, a head-mounted display (HMD) includes a mounting assembly where one or more optical elements of an optical assembly are fixed to a housing via one or more adhesive elements. However, in the conventional configurations, alignment of optical elements for pancake lenses can be difficult due to the relatively tight tolerances that need to be met between the different polarizing elements to ensure image quality.

SUMMARY

A pancake lens display assembly of a head mounted display (HMD) includes a pancake lens and an electronic display. The pancake lens comprises a first lens that includes a quarter-waveplate and a partially reflective surface (e.g., a 50/50 mirror) and a second lens that includes a reflective polarizer. An alignment system positions the first lens relative to the second lens to align the reflective polarizer of the second lens with the quarter-waveplate of the first lens. The pancake lens comprises a lens housing and the alignment system mounts the second lens to the lens housing and positions the first lens in optical series with the second lens a distance from where the first lens will be mounted to the lens housing. The alignment system rotates the first lens about the optical axis to position a first orientation axis of the quarter-waveplate on the first lens such that the first orientation axis is at an angle relative to a second orientation axis of the reflective polarizer on the second lens where light transmitted through the second lens and then through the first lens is substantially circularly polarized. The alignment system then mounts the second lens to the lens housing such that the quarter-waveplate is at the angle relative to the reflective polarizer.

In one embodiment, the alignment system uses a test display that directs test light through the first lens and the second lens to a sensor. In one embodiment, the sensor is a camera. The partially reflective surface of the first lens transmits a first portion of the test light to the second lens. Some of the first portion of the test light is reflected by the reflective polarizer of the second lens, however, a second portion of the test light is transmitted. The transmitted test light results in a ghost image captured by the camera. Accordingly, the alignment system rotates the first lens about the optical axis relative to the second lens through a range of angles to identify the angle between the first orientation axis of the quarter-waveplate on the first lens and the second orientation axis of the reflective polarizer on the second lens. In this embodiment, this angle is where brightness of a ghost image is below a threshold intensity relative to other angles in the range of angle.

In one embodiment, the alignment system uses a test illumination source that directs test light through the second lens and then the first lens to a circular polarimeter (e.g., a stokes snapshot polarimeter) that can determine an amount of circular polarization of the test light. Accordingly, the alignment system rotates the first lens about the optical axis relative to the second lens through a range of angles to identify the angle between the first orientation axis of the quarter-waveplate on the first lens and the second orientation axis of the reflective polarizer on the second lens. In this embodiment, this angle is where an amount of circular polarized light received at the circular polarimeter is above a threshold amount relative to other angles in the range of angle.

BRIEF DESCRIPTION OF THE DRAWINGS

FIG. 2 shows a first step in the active alignment process that includes a second lens of a pancake lens being mounted to a lens housing, in accordance with one or more embodiments.

FIG. 3 shows a second step in the active alignment process that includes the second lens of the pancake lens mounted to the lens housing while adhesive and compression foam are applied to the lens housing for mounting a first lens, in accordance with one or more embodiments.

FIG. 9B is another flowchart illustrating a process for actively aligning a pancake lens display assembly, in accordance with one embodiment.

The figures depict embodiments of the present disclosure for purposes of illustration only. One skilled in the art will readily recognize from the following description that alternative embodiments of the structures and methods illustrated herein may be employed without departing from the principles, or benefits touted, of the disclosure described herein.

DETAILED DESCRIPTION

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

Folded Optical Path of a Pancake Lens

Figure 1A:
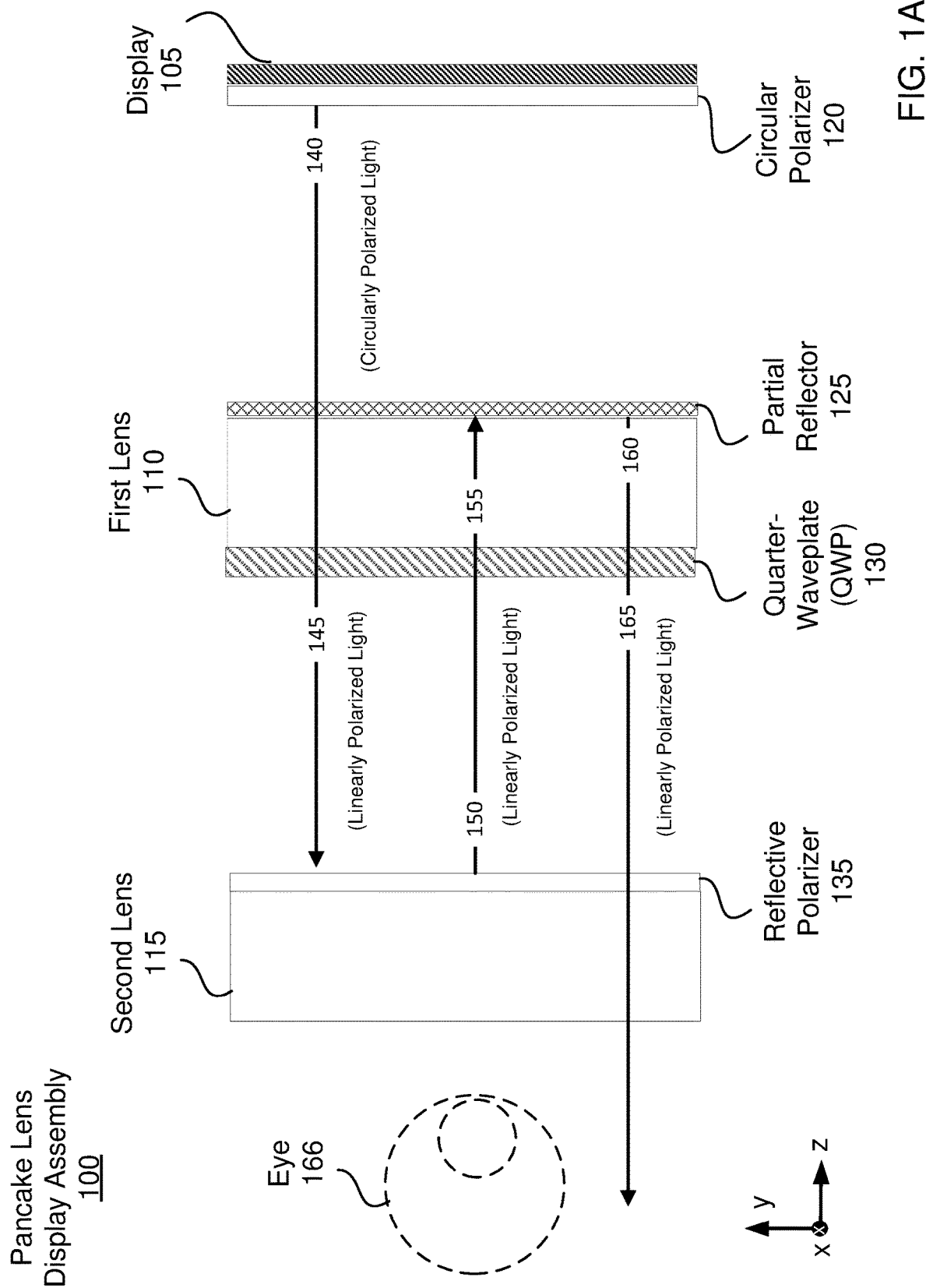
FIG. 1A shows a folded optical path of a pancake lens display assembly, in accordance with one or more embodiments.

FIG. 1A shows a folded optical path of pancake lens display assembly 100, in accordance with one or more embodiments. The pancake lens display assembly 100 includes a display 105, a first lens 110, and a second lens 115. One or more surfaces of the first lens 110 and/or the second lens 115 can be shaped to correct for field curvature, such as be shaped to be spherically concave (e.g., a portion of a sphere), spherically convex, planar, rotationally symmetric aspheric, a freeform shape, or some other shape that mitigates field curvature. In some embodiments, the shape of one or more surfaces of the first lens 110 and/or the second lens 115 can be designed to additionally correct for other forms of optical aberration. In some embodiments, one or more of the optical elements within pancake lens display assembly 100 may have one or more coatings, such as anti-reflective coatings and enhance contrast. The display 105 includes a circular polarizer 120 that converts light emitted from the display 105 into circular polarized light. In one embodiment, the circular polarizer 120 is a film on the surface of the display 105. The first lens 110 includes a partial reflector 125 and a quarter-waveplate (QWP) 130. The partial reflector 125 (e.g., a 50/50 mirror) is configured to reflect a portion of light incident on its surface and transmit another portion. The QWP 130 is configured to convert circularly polarized light into linearly polarized light and vice versa. The second lens 115 includes a reflective polarizer 135 configured to transmit a desired polarization state while reflecting other polarization states.

In operation, light 140 is directed from the display 105 and circular polarizer 120 to the partial reflector 125. Light 140 is circularly polarized. A first portion of light 140 is reflected by the partial reflector 125, and a second portion of light 140 is transmitted by the partial reflector 125 towards QWP 130. In some embodiments, partial reflector 125 is configured to reflect 50% of incident light (e.g., light 140, light 155, etc.). QWP 130 changes the polarization of light 140 from circular to linear (referred to as light 145). Light 145 is incident on the reflective polarizer 135, which reflects light that is polarized in a blocking direction (e.g., x direction) and transmits light that is polarized in a perpendicular direction to the blocking direction (e.g., y-direction). At this point, light 145 is linearly polarized in the blocking direction. Thus, reflective polarizer 135 reflects light 145 and the reflected light is referred to as light 150. Light 150 is incident on QWP 130, which changes the light 150 from being linear polarized to light 155 that is circularly polarized and partial reflector 125 reflects a portion of light 155 (while transmitting another portion), as described above. The reflected portion of light 155 is reflected back toward QWP 130 as light 160, which is also circularly polarized; however, its handedness is opposite that of light 155 and 145 due to the reflection from partial reflector 125. Thus, QWP 130 changes the polarization of light 160 from circularly polarized to light 165 that is linearly polarized. However, as the handedness of the light 160 is opposite to that of light 145, the polarization of light 165 is perpendicular to that of light 145. Accordingly, light 165 is linearly polarized in a direction (e.g., y) perpendicular to the blocking direction (e.g., x) and is therefore transmitted by reflective polarizer 135 as light 165 to an eye 166 of a user. Operation of a pancake lens display assembly and other variations thereof are further described in U.S. patent application Ser. No. 15/292,108, filed on Oct. 12, 2016, which is incorporated by reference in its entirety.

The process described above, however, is an idealized version of reality. There can be other less ideal light paths in a pancake lens display assembly due to imperfections in one or more of the optical elements and these imperfections can cause light leakage, ghost images, and so forth. In theory, light leakage can be eliminated, but in reality, the wavelength of light varies (e.g., over the visible spectrum) and a retardance of QWP 130 is a function of wavelength and varies with wavelength. Accordingly, QWP 130 may not in reality be able to provide a quarter-wave retardance over all possible wavelengths of light falling incident thereon. Thus, alignment of the reflective polarizer 135 of the second lens 115 to the QWP 130 of the first lens 110 can be difficult due to the relatively tight tolerances that need to be met between these elements to ensure image quality. In particular, at less optimal angles between a first orientation axis of the QWP 130 and a second orientation axis of the reflective polarizer 135, a portion light from the display 105 makes a straight pass through the first lens 110 and the second lens 115 (i.e., without undergoing any of the aforementioned reflections) that is observed at the eye 166 as a ghost image. Thus, a system and method for actively aligning the reflective polarizer 135 of second lens 115 to the QWP 130 of the first lens 110 to at least minimize light leakage, ghost images, and so forth are disclosed.

Alignment System

Figure 1B:
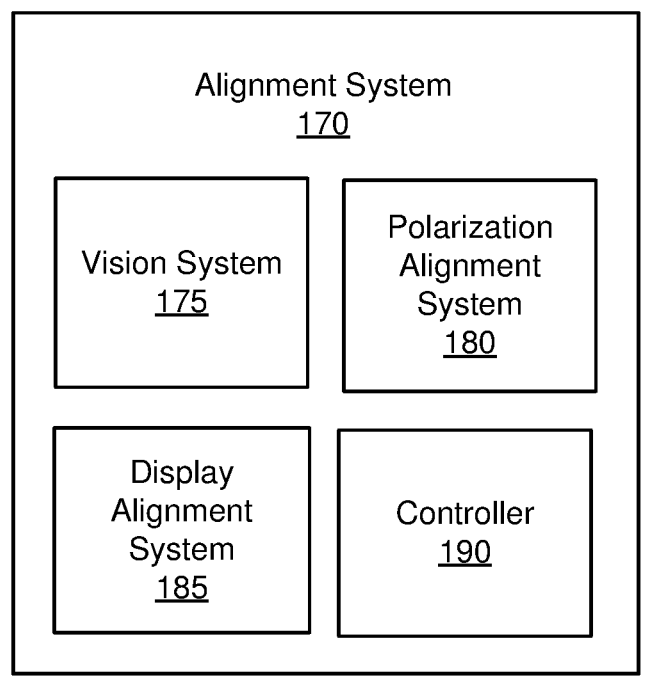
FIG. 1B is an example system for active alignment of pancake lens display assembly, in accordance with one or more embodiments.

FIG. 1B shows an example alignment system 170 for the active alignment of a first lens relative to a second lens of pancake lens display assembly, in accordance with one embodiment. The alignment system 170 includes a vision system 175, a polarization alignment system 180, a display alignment system 185, and a controller 190. In other embodiments, the alignment system 170 can have any combination of elements listed with any additional systems, modules, or elements.

The vision system 175 is a computer vision based system that automates one or more steps in the alignment process. The vision system 175 may include a processor, one or more cameras, a lens mounting element (e.g., one or more lens holding prongs, a vacuum chuck, etc.) on a rotatable stage, and software that performs tasks such as part selection, adhesive and compression foam application, second lens alignment and mounting, and quality assurance, among other possibilities. In other embodiments, the alignment system 170 can have any combination of elements listed with any additional systems, modules, or elements.

The vision system 175 is configured to mount a lens housing of a pancake lens display assembly to a lens housing fixture mount of a head mounted display (HMD). In one embodiment, the one or more cameras of the vision system 175 guide placement of the lens housing using datums on the lens housing fixture mount. The datums operate as visual indicators for the visions system 105 to guide alignment and placement of the lens housing relative to the lens housing fixture mount. The vision system 175 may also be configured to apply adhesive to the lens housing for mounting a second lens of the pancake display assembly to the lens housing and then mount the second lens to the lens housing. This includes aligning the nose cut of the second lens to the corresponding nose cut on the lens housing, moving the second lens into place via the lens mounting element, and pressing the second lens against the adhesive on the lens housing. The vision system 175 may also be configured to apply pressure sensitive adhesive (PSA) and compression foam to the lens housing to mount the first lens to the lens housing. These processes are described in more detail with respect to FIGS. 2-3.

The vision system 175 is also configured to mount a display of the HMD to a display housing. This includes applying PSA to the display housing and guiding the display with the correct alignment into position on the display housing to adhere the display to the PSA on the display housing. In one embodiment, the one or more cameras of the vision system 175 guide placement of the display in x, y, and rotation about z and the lens mounting element of the vision system 175 applies a force between the display and the display housing to cause the PSA to bond the display with the display housing. This process is described in more detail with respect to FIG. 5. While FIG. 1 shows a single vision system 175 that is described here as performing both lens and display mounting, there could be two different visions systems each dedicated to performing one of these separate steps. For example, a first vision system could mount the second lens to the lens housing while a second vision system mounts the display to the display housing in an assembly line.

The polarization alignment system 180 includes a central mount, a rotating collar that rotates relative to the central mount, a lens mounting element attached to and that rotates with the rotating collar, and a sensor. In one embodiment, the lens mounting element can be the same lens mounting element described with respect to the vision system 175. The lens mounting element is configured to hold the first lens at a distance from a location where the first lens is to be mounted to the lens housing while the rotating collar causes the first lens to rotate about an optical axis of the pancake lens display assembly. The first lens is rotated until a first orientation axis of a quarter-wave plate on the first lens is at an angle relative to a second orientation axis of a reflective polarizer on the second lens. How this angle is determined is described in more detail below.

In one embodiment, the central mount includes an illumination source that displays a pattern of light and a film stack configured to covert test light from the illumination source into circularly polarized test light. The polarization alignment system additionally includes a camera focused on a straight pass through the second lens and then through the first lens at the illumination source. The straight pass of light through second lens and then through the first lens is the light path straight from the illumination source without undergoing any reflections. The sensor (e.g., camera) is located where an eye of a user would be located and the illumination source is located where the display of the HMD would be located. In this embodiment, the circularly polarized test light passes through the first lens and then through the second lens and is imaged by the sensor as a ghost image. Accordingly, the angle between the first orientation axis of the quarter-wave plate on the first lens and the second orientation axis of the reflective polarizer on the second lens corresponds to a relative position of the first lens and the second lens such that the brightness of the ghost image is less than a threshold value (or minimized relative to other angles though which the first lens is rotated). In one embodiment, an acceptable threshold range would be between 0.3-0.7%; however, the threshold values are based on total system performance and most likely set to minimize the signal of the ghost image relative to a primary image of the pattern of light from the illumination source. In one embodiment, this includes rotating the first lens until the angle between the first orientation axis of the quarter-wave plate on the first lens and the second orientation axis of the reflective polarizer on the second lens is identified based on the brightness of the ghost image. The polarization alignment system 180 is then configured to mount the second lens to the lens housing at this angle. This process is described in more detail with respect to FIG. 4.

The display alignment system 185 is configured to mount the display housing to the lens housing. This includes mating the display housing with the lens housing via two or more screws that are adjustable to align the display relative to the first and second lens. Accordingly, the display alignment system 185 includes a plurality of optical alignment cameras each pointed at the display through the second lens and the first lens at various field angles. The display alignment system 185 may also cause the display of the HMD to be powered on to display a test image (e.g., a pattern, a grid, 3 offset dots, etc.) for performing optical alignment using the plurality of optical alignment cameras to adjust the position of the display in z using the two or more screws. This process is described in more detail with respect to FIG. 6.

In an alternative embodiment, the polarization alignment system 180 includes an illumination source, a central mount with a central opening, a circular polarimeter (e.g., stokes snapshot polarimeter), a rotating collar that rotates relative to the central mount, and a lens mounting element (e.g., lens holding prongs) attached to and that rotate with the rotating collar. In this embodiment, the sensor is the stokes snapshot polarimeter. The illumination source is located on the eye-side of the pancake lens display assembly and configured to direct test light through the second lens, then through the first lens, and finally through the central opening of the central mount to the stokes snapshot polarimeter. The lens mounting element is configured to hold the first lens at a distance from a location where the first lens is to be mounted to the lens housing while the first lens is rotated about the optical axis of the pancake lens display assembly. Accordingly, the angle between the first orientation axis of the quarter-wave plate on the first lens and the second orientation axis of the reflective polarizer on the second lens corresponds to a relative position of the first lens and the second lens such that an amount of circularly polarized light (or ellipticity) received by the circular polarimeter is greater than a threshold value (or maximized relative to other angles though which the first lens is rotated). In one embodiment, an acceptable threshold range would be between greater than 96% circularly polarized light (or ellipticity). These values could be measured at several different field angles and wavelengths and a more complex weighting metric could be used and rotation optimized until the scoring metric is either minimized or maximized.

In one embodiment, the first lens is rotated until the angle between the first orientation axis of the quarter-wave plate on the first lens and the second orientation axis of the reflective polarizer on the second lens is identified based on the amount of circularly polarized light received by the stokes snapshot polarimeter. The polarization alignment system 180 is then configured to mount the second lens to the lens housing at this angle. This process is described in more detail with respect to FIG. 7.

In this alternative embodiment, the display alignment system 185 includes a rotation stage, a display vacuum chuck, and a camera. The display vacuum chuck is configured to position the display and display housing a distance from where the display housing will be mounted to the lens housing to allow the display housing to freely rotate. The display is powered on to display a test image (emitting circularly polarized test light) and a camera is focused on a straight pass through to a ghost image corresponding to the test image, as observed on the other side of the second lens and first lens. The display housing (with the display) is rotated via the rotation stage through a range of angles to identify a position for the display where the brightness of the ghost image is less than a threshold value (or minimized relative to other angles though which the display is rotated). The display vacuum chuck then moves the display housing into position in z until the display housing contacts compression foam of the lens housing and the one or more adjustment screws are rotated into place to attach the display housing. The display vacuum chuck then releases the display. This process is described in more detail with respect to FIG. 8.

The controller 190 processes information from the one or more cameras of the vision system 175, the sensors (e.g., camera, stokes snapshot polarimeter, etc.), and/or the plurality of optical alignment cameras and is configured to generate commands for the vision system 175, polarization alignment system 180, and the display alignment system 185, as described above, to align the first lens relative to the second lens in a pancake lens display assembly. The controller 190 may comprise a processor and a computer-readable storage medium.

Alignment Method

FIG. 2 shows a first step 200 in an active alignment process for pancake lens based display assembly, in accordance with one embodiment. In first step 200, the vision system 175 first mounts a lens housing 210 of a pancake lens display assembly to a lens housing fixture mount 215 that is attached to (or part of) the frame of a head mounted display (HMD). The vision system 175 may also apply adhesive 220 to the lens housing 210 for mounting a second lens 205 to the lens housing 210 and then mount the second lens 205 to the lens housing 210. In one embodiment, this includes aligning a nose cut of the second lens 205 to the corresponding nose cut outline of the lens housing 210, moving the second lens 205 into place, and applying pressure between the second lens 205 and the adhesive 220 on the lens housing 210 to bond the second lens 205 to the lens housing 210.

FIG. 3 shows a second step 300 in the active alignment process, in accordance with one embodiment, that includes applying adhesive 310 and compression foam 305 to the lens housing 210 for mounting a first lens. In one embodiment, the adhesive 310 is pressure sensitive adhesive (PSA) that bonds a first lens to the lens housing 210 when pressure between the first lens to the lens housing 210.

Figure 4:
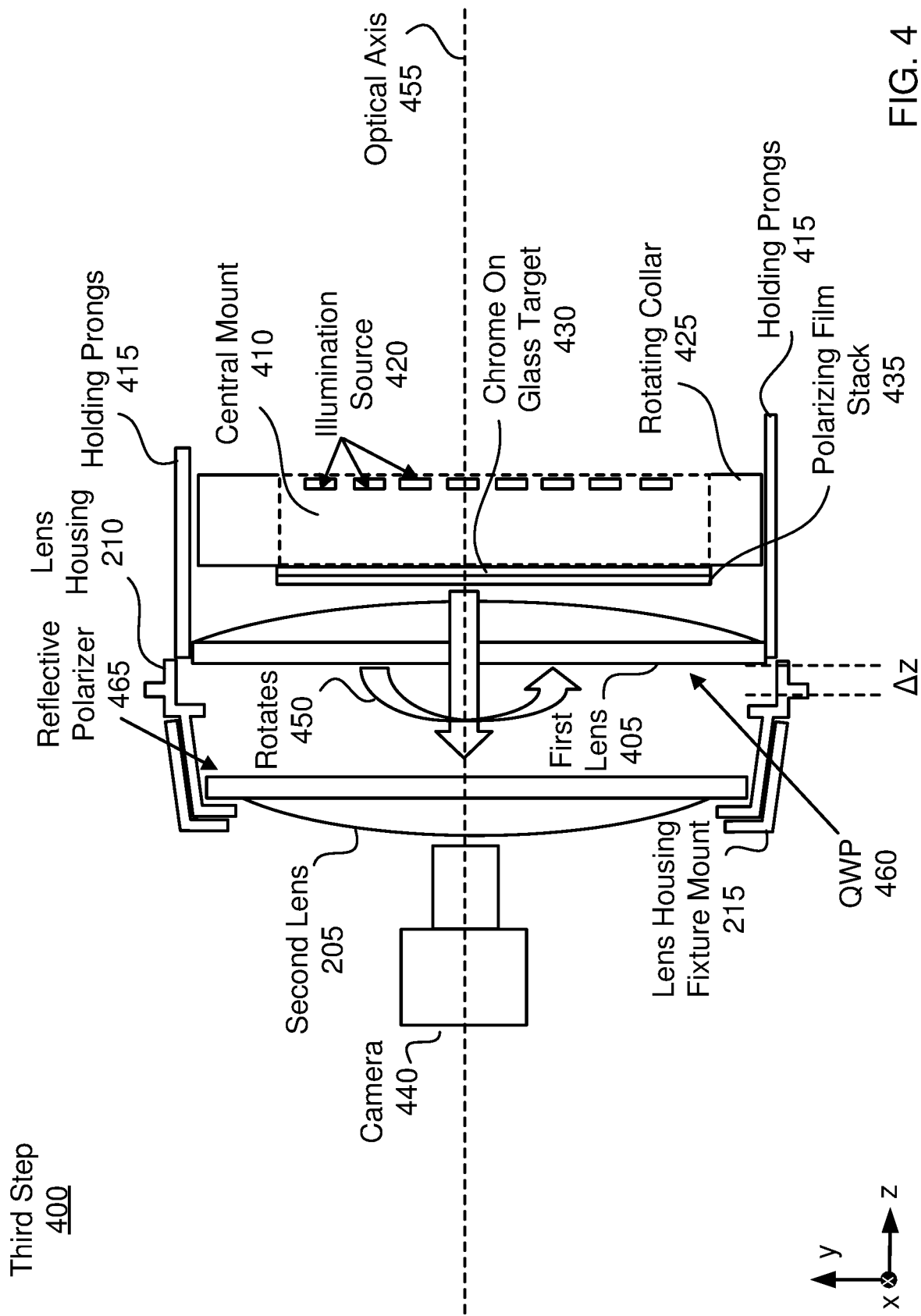
FIG. 4 shows a third step in the active alignment process that includes a mount configured to hold and rotate the first lens relative to the second lens, in accordance with one or more embodiments.

FIG. 4 shows a third step 400 in the active alignment process, in one embodiment, that includes rotating a first lens 405 relative to the second lens 205 to identify an angle where the brightness of a ghost image is less than a threshold value. The polarization alignment system 180, in this embodiment, includes a central mount 410, a rotating collar 425 that rotates relative to the central mount 410, and holding prongs 415 attached to and that rotate with the rotating collar 425. The polarization alignment system 180 positions the first lens 405 in optical series with the second lens 205 that is coupled to the lens housing 210 using the holding prongs 415. The holding prongs 415 are configured to hold the first lens 405 at a distance ($\Delta z$) from a location where the first lens 405 is to be mounted to the lens housing 210 while rotating the first lens 405 to identify the angle.

The central mount 410 additionally includes an illumination source 420, a chrome-on glass target 430, and a polarizing film stack 435. The illumination source 420 emits test light and the polarizing film stack 435 converts the test light into circularly polarized test light that is directed to quarter-wave plate (QWP) 460 on a surface of the first lens 405. As described with respect to FIG. 1A, the QWP 460 converts the circularly polarized test light to linearly polarized test light as the test light travels to reflective polarizer 465 on a surface of the second lens 205. The reflective polarizer 465 reflects linearly polarized light in a blocking direction (e.g., x direction) and transmits light that is polarized in a perpendicular direction to the blocking direction (e.g., y-direction). Since the polarization orientation of light at this point is not yet aligned with that of the reflective polarizer 465, the test light is not exactly parallel or orthogonal to the polarization axis of the reflective polarizer 465. Accordingly, some portion of the test light is transmitted on the straight pass (i.e., without reflections), thereby, forming a ghost image where this light is imaged by the camera 440. The amount of the test light that passes through the reflective polarizer 465 varies based on the angle between a first orientation axis of the QWP 460 and a second orientation axis of the reflective polarizer 465.

Accordingly, the first lens 405 is rotated 450 about an optical axis 455 via the holding prongs 415 and rotating collar 425 to position the first orientation axis of QWP 460 such that the first orientation axis and a second orientation axis of the reflective polarizer 465 on the second lens 205 are at this angle where brightness of the ghost image is minimized (or less than a threshold intensity value). Thus, the rotating collar 425 rotates the first lens 405 through a range of angles until the camera 440 identifies the angle where the ghost image is minimized. Additionally, at this angle, the light that is transmitted through the first lens 405 and then through the second lens 205 is substantially circularly polarized.

Once the angle where brightness of the ghost image is minimized (or less than a threshold intensity value) is identified, the holding prongs 415 mount the first lens 405 to the lens housing 210. This includes the holding prongs 415 moving the first lens 405 at the identified angle into position to make contact between the first lens 405 and the adhesive 310 and compression foam 305 on the lens housing 210. In one embodiment, the adhesive 310 is pressure sensitive adhesive and polarization alignment system 180 is configured to generate pressure between the first lens 405 and the adhesive 310 and compression foam 305 on the lens housing 210 to mount the first lens 405 to the lens housing 210.

Figure 5:
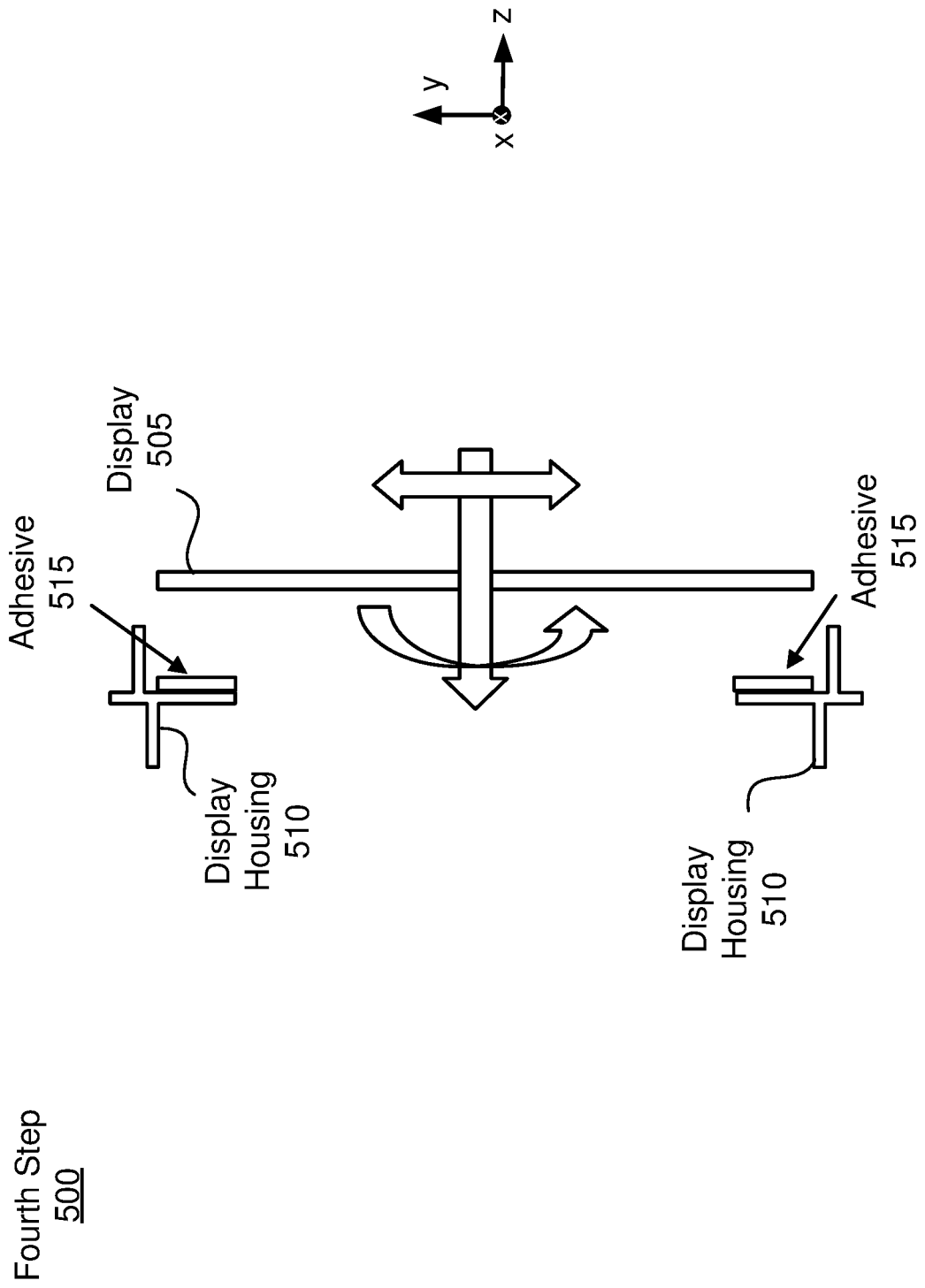
FIG. 5 shows a fourth step in the active alignment process that includes a display housing with adhesive applied to mount a display to the display housing, in accordance with one or more embodiments.

FIG. 5 show a fourth step 500 in the active alignment process that includes a display housing 510 with adhesive 515 applied to mount a display 505 to the display housing 510, in accordance with one embodiment. In one embodiment, the vision system 175 is configured to mount the display 505 of the HMD to the display housing 510. This includes applying adhesive 515 to the display housing 510 and guiding the display 505 with the correct alignment into position on the display housing 510 to adhere the display 505 to the adhesive 515 on the display housing 210. In one embodiment, the adhesive 515 is pressure sensitive adhesive (PSA) and the vision system 175 is configured to create pressure between the display 505 and the display housing 510 to cause the adhesive 515 to bond the display 505 with the display housing 510.

Figure 6:
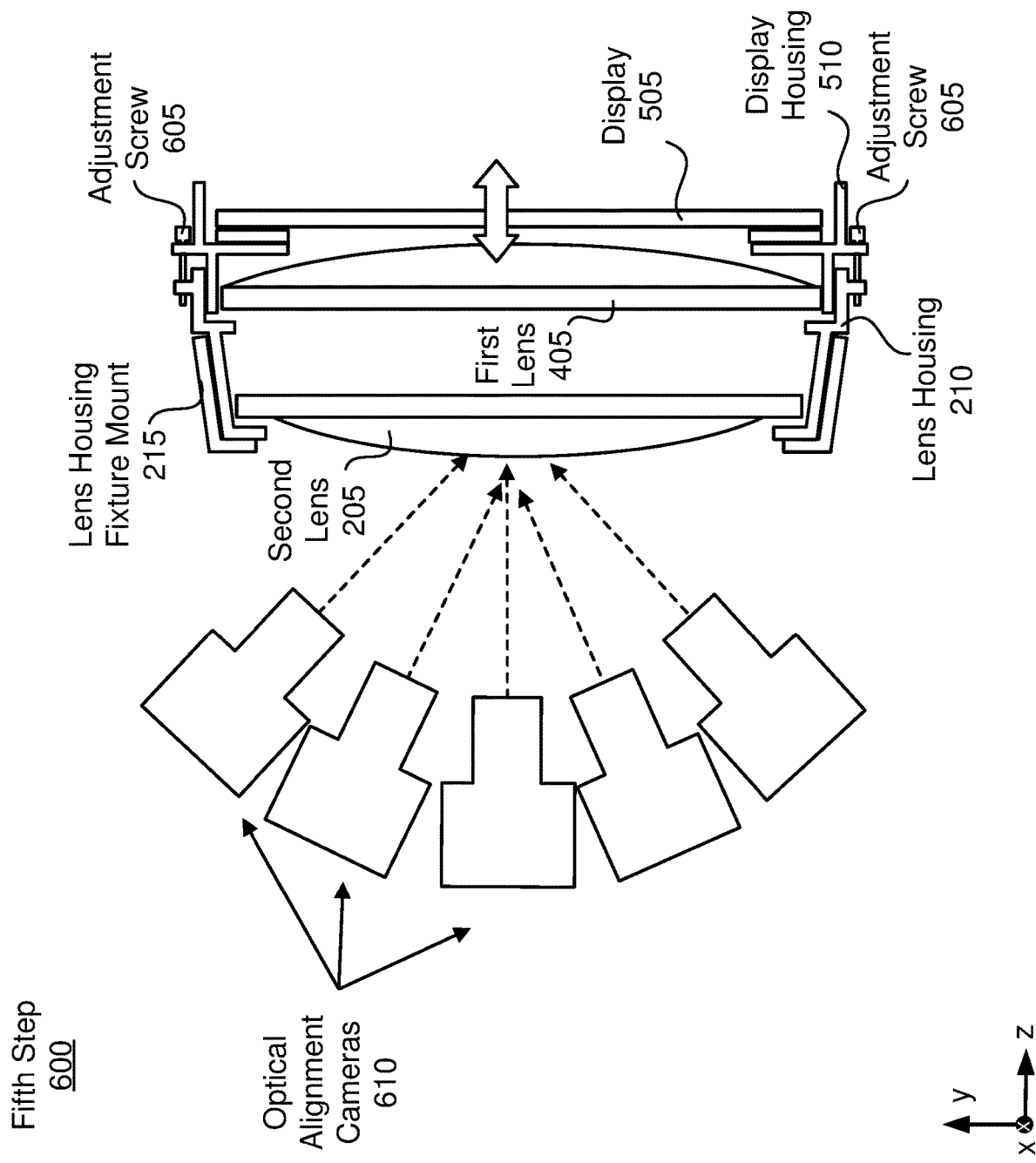
FIG. 6 shows a fifth step in the active alignment process that includes the display housing being mounted and aligned to the lens housing via adjustable screws, in accordance with one or more embodiments.

FIG. 6 shows a fifth step 600 in the active alignment process that includes the display housing 510 being mounted and aligned to the lens housing 210, in accordance with one embodiment. The display alignment system 185 mates the display housing 510 to the lens housing 210 via two or more adjustment crews 605 (e.g., three adjustment screws) that are adjustable to align the display 505 relative to the first lens 405 and second lens 205 in z along the optical axis and in tip/tilt. The display alignment system 185 includes a plurality of optical alignment cameras 610 each pointed at the display 505 through the second lens 205 and the first lens 405 at various field angles or angles relative to the optical axis of the second lens 205 and the first lens 405.

Accordingly, the display 505 of the HMD is powered on to display a test image (e.g., a pattern, a grid, 3 offset dots, etc.) and the plurality of optical alignment cameras 610 are each focused on the test image at approximately 1-4 m (e.g., 2.5 m). The display 505 is then adjusted along the z-axis and in tip and tilt to achieve equal focus across the display 505 using the plurality of optical alignment cameras 610. The adjustments along z-axis and in tip and tilt are performed using the two or more adjustment crews 605. In one embodiment, there are three adjustment screws 605. Adjustments in tip and tilt can be made by changing the angle between the lens housing 210 and display housing 510 via the compression foam 305 by tightening one adjustment crew 605 more relative to the other two adjustment screws 605, for example. Once adjustment of the display housing 510 is complete, a ultra violet (UV) cure or other adhesive may be applied to fix the adjustment screws 605 into place. In an alternative embodiment, display alignment system 185 mates the display housing 510 to the lens housing 210 using other fastening methods, such as an adhesive. In this embodiment, the display vacuum chuck 805 (or other mounts) holds the display 505 and makes active adjustments along the optical axis, tip, and tilt while holding the display 505 and display housing 510 in place until the fastening method is complete (e.g., the adhesive cures). Thus, in one embodiment, the adjustment along the optical axis and in tip and/or tilt is made using the display alignment system 185 before the adhesive cures.

Figure 7:
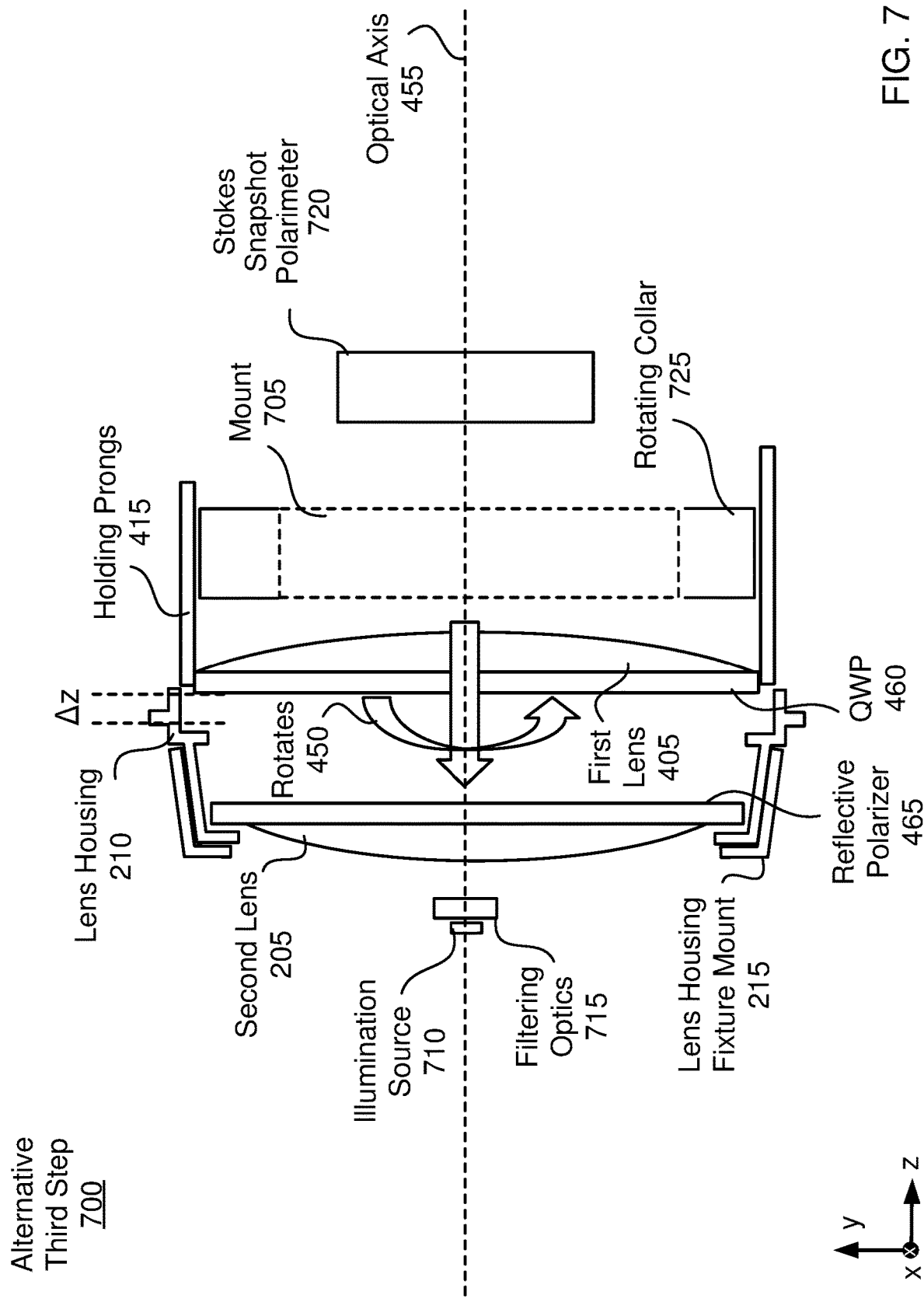
FIG. 7 shows an alternative third step in the active alignment process that includes a mount configured to hold and rotate the first lens relative to the second lens, in accordance with one or more embodiments.

FIG. 7 shows an alternative third step 700 in the active alignment process that includes a mount 705 configured to hold and rotate 450 the first lens 405 relative to the second lens 205, in accordance with one embodiment. The polarization alignment system 180, in this embodiment, includes an illumination source 710, a mount 705 with a central opening, a circular polarimeter 720, a rotating collar 725 that rotates relative to the mount 705, and holding prongs 415 attached to and that rotate with the rotating collar 725. The illumination source 710 is located on the eye-side of the second lens 205 and configured to direct test light through the second lens 205, then through the first lens 405, and finally through the central opening of the mount 705 to the stokes snapshot polarimeter 720.

As above, the polarization alignment system 180 positions the first lens 405 in optical series with the second lens 205 that is coupled to the lens housing 210 using the holding prongs 415. The holding prongs 415 are configured to hold the first lens 405 at a distance ($\Delta z$) from a location where the first lens 405 is to be mounted to the lens housing 210 while rotating 450 the first lens 405 about the optical axis 455 to identify an angle where, in this embodiment, an amount of circularly polarized light received by the stokes snapshot polarimeter 720 is greater than a threshold value (or maximized relative to other angles though which the first lens 405 is rotated).

The illumination source 710 is configured to emit test light and additionally includes filtering optics configured to generate linearly polarized test light from the test light. The linearly polarized test light emitted from the illumination source 710 passes through the reflective polarizer 465 on the surface of the second lens 205 to the QWP 460 on the surface of the first lens 405. The QWP 460 on the surface of the first lens 405 converts the linearly polarized test light to circularly polarized test light as the test light travels to the stokes snapshot polarimeter 720 through the central opening of the mount 705.

Accordingly, the angle between the first orientation axis of the QWP 460 on the first lens 405 and the second orientation axis of the reflective polarizer 465 on the second lens 205 corresponds to a relative position of the first lens 405 and the second lens 205 such that an amount of circularly polarized light received by the stokes snapshot polarimeter 720 is greater than a threshold value. In one embodiment, the first lens 405 is rotated 450 until the angle between the first orientation axis of the QWP 460 and the second orientation axis of the reflective polarizer 465 is identified based on the amount of circularly polarized light received by the stokes snapshot polarimeter 720. The polarization alignment system 180 is then configured to mount the first lens 405 to the lens housing 210 at this angle.

Figure 8:
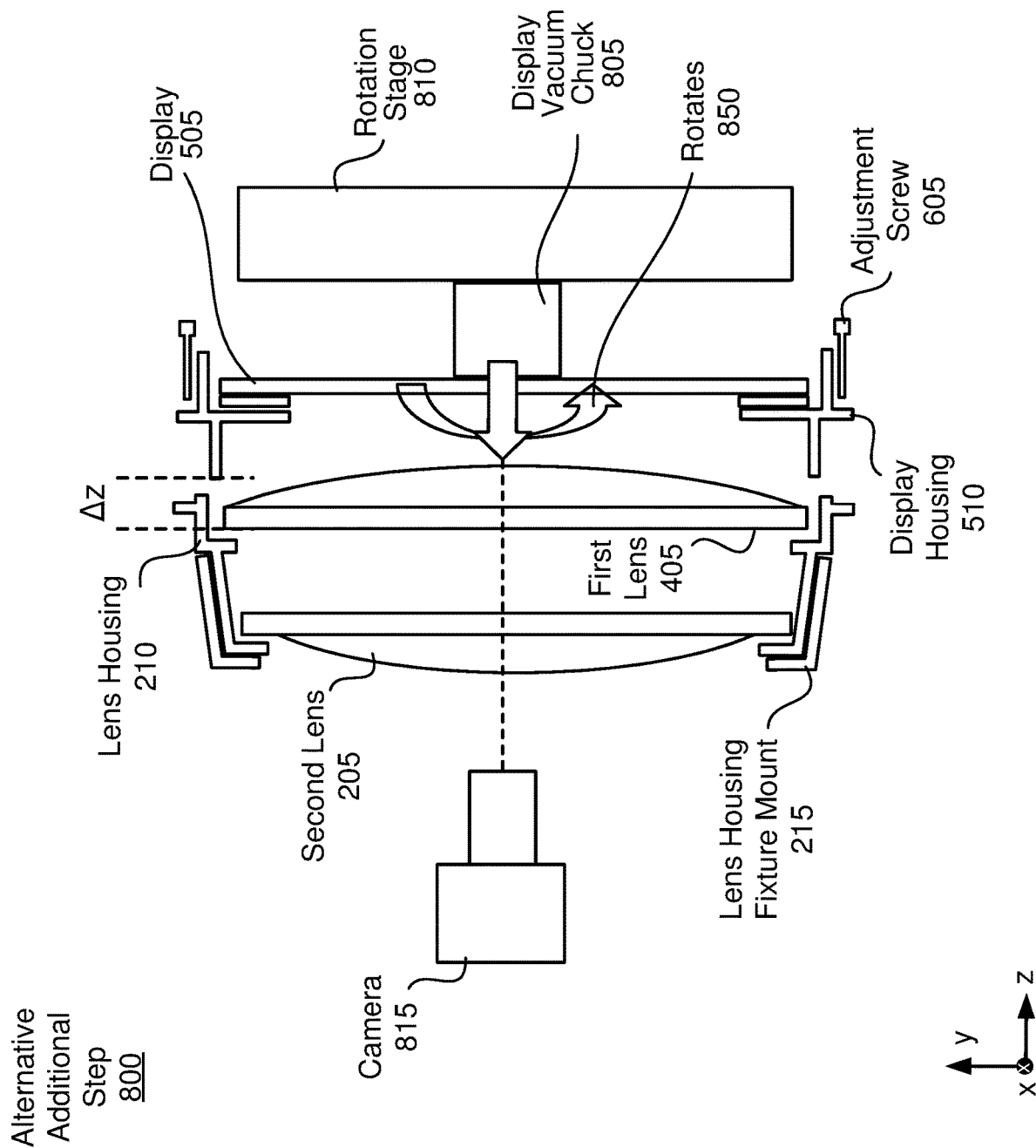
FIG. 8 shows an additional step accompanying the alternative third step that includes the display housing being mounted and aligned to the lens housing of FIG. 7, in accordance with one or more embodiments.

FIG. 8 shows an additional step 800 accompanying the alternative third step 700 that includes the display housing 210 being mounted and aligned to the lens housing 210 of FIG. 7, in accordance with one embodiment. After the first lens 405 to the lens housing 210, the display 505 is rotated relative to the second lens 205 and the first lens 405 in a process that is similar to the alignment method of FIG. 4 used to align the first lens 405 relative to the second lens 205. While the first lens 405 and the second lens 205 are already aligned and the display is outputting circularly polarized light, in some embodiments there is benefit to rotating the display 505 such that the columns are oriented relative to the lens housing 210 so that, in head mounted display, the columns are aligned between the left and right eyes of the user (e.g., <0.5 degrees difference). In this embodiment, the display alignment system 185 includes a rotation stage 810, a display vacuum chuck 805, and a camera 815. The display vacuum chuck 805 is configured to hold and position the display 505 and display housing 510 a distance from where the display housing 510 will be mounted to the lens housing 210 to allow the display housing 510 to freely rotate. The display 505 is configured to emit circularly polarized test light and is powered on to display a test image while the camera 815 is focused on a straight pass through to a ghost image created by the test image, as observed from the eye-side of the pancake lens display assembly. The display housing 510 (with the display 505) is rotated 850 via the rotation stage 810 through a range of angles to identify a position for the display 505 where the brightness of the ghost image is less than a threshold value (or minimized relative to other angles though which the display 505 is rotated).

Once the angle where the brightness of the ghost image is less than a threshold value is identified, the display vacuum chuck 805 moves the display housing 510 into position in z until the display housing contacts compression foam 605 of the lens housing 210 and the one or more adjustment screws 605 are rotated into place to attach the display housing 510. The display vacuum chuck 805 then releases the display 505. Accordingly, as described above with respect to FIG. 6, adjustment of the display 505 along the z-axis and in tip and tilt are performed using the two or more adjustment crews 605 and a UV cure or other adhesive is applied to fix the adjustment screws 605 into place.

A Methods for Actively Aligning a Pancake Lens Display Assembly

Figure 9A:
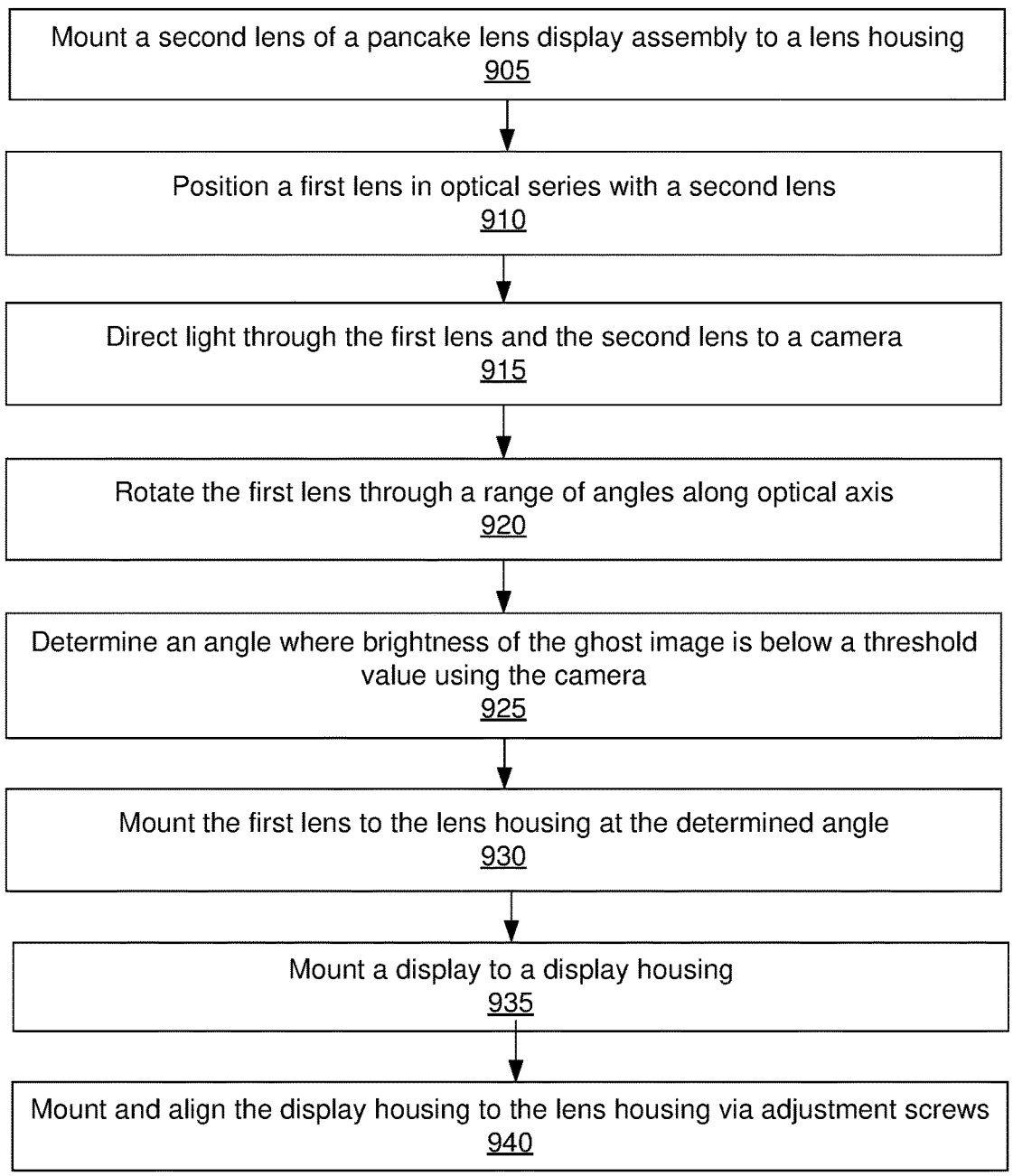
FIG. 9A is a flowchart illustrating a process for actively aligning a pancake lens display assembly, in accordance with one embodiment.

FIG. 9A is a flowchart illustrating a process 900 for actively aligning a pancake lens display assembly of a head mounted display (HMD), in accordance with one embodiment. The process 900 of FIG. 9A may be performed by the components of an apparatus, e.g., the alignment system 170, the vision system 175, the polarization alignment system 180, the display alignment system 185. Likewise, embodiments may include different and/or additional steps, or perform the steps in different orders.

The alignment system 100 mounts 905 a second lens to a lens housing of the HMD. In one embodiment, this includes aligning a nose cut of the second lens to the corresponding nose cut outline of the lens housing, moving the second lens into place, and applying pressure between the second lens and adhesive on the lens housing to bond the second lens to the lens housing.

The alignment system 170 positions 910 a first lens in optical series with the second lens. The first lens includes a partially reflective coating (e.g., a 50/50 mirror) on a first surface and a quarter-waveplate (QWP) on a second surface and the second lens includes a reflective polarizer on a first surface. In other embodiments, the partially reflective coating and the QWP can be different layers stacked together on either the first or second surfaces of the first lens and the reflective polarizer can also be on either the first surface or a second surface of the second lens. The second lens is mounted to a lens housing and the first lens is positioned in optical series with the first lens using the polarization alignment system 180 configured to rotate the first lens along an optical axis of the pancake lens display assembly.

The alignment system 170 directs 915 circularly polarized light through the first lens and the second lens to a sensor. The sensor, in this embodiment, is a camera and the partially reflective coating (e.g., 50/50) of first lens is configured to transmit a first portion of the light to the second lens while reflecting a second portion. The QWP of the first lens converts the circularly polarized light to linearly polarized light, and the linearly polarized light travels to the reflective polarizer of the second lens. While the axis orientation of the linearly polarized light at this pass is not aligned with the axis of orientation of the reflective polarizer of the second lens, the reflective polarizer transmits a second portion of the light resulting in a ghost image captured by the camera. For example, the axis orientation of the reflective polarizer may be configured to transmit linearly polarized light oriented along the x-axis and block linearly polarized light oriented along the y-axis. The linearly polarized light at this pass (i.e., the straight pass before any reflection) is ideally 100% oriented in along the y-axis, which would be completely reflected by the reflective polarizer. However, this is not the case in reality. While the linearly polarized light is primarily oriented along the y-axis, there is likely a small portion of the light that is oriented along the x-axis (e.g., 98% y-axis and 2% x-axis). This small portion of the linearly polarized light (e.g., the 2% of it oriented along the x-axis) makes the straight pass through the first and second lens without ever being reflected by the reflective polarizer to the camera as the ghost image.

The alignment system 170 rotates 920 the first lens through a range of angles along the optical axis. While rotating, the alignment system 170 determines 925 the angle where brightness of the ghost image is minimized relative to other angles in the range of angles. Additionally, at this angle, a first orientation axis of the QWP on the first lens is positioned relative to a second orientation axis of the reflective polarizer on the second lens such that light transmitted through the second lens and then through the first lens is substantially circularly polarized.

The alignment system 170 mounts 930 the first lens to the lens housing at the determined angle. This includes the holding prongs moving the first lens at the identified angle into position to make contact between the first lens and an adhesive (e.g., pressure sensitive adhesive) and compression foam on the lens housing. In one embodiment, the polarization alignment system 180 is configured to generate pressure between the first lens and the adhesive and compression foam on the lens housing to mount the first lens to the lens housing.

The alignment system 170 mounts 935 the display of the HMD to a display housing. This includes applying adhesive to the display housing and guiding the display with the correct alignment into position on the display housing to adhere the display to the adhesive on the display housing. In one embodiment, the adhesive is pressure sensitive adhesive (PSA) and the vision system 175 or the display alignment system 185 is configured to create pressure between the display and the display housing to cause the adhesive to bond the display with the display housing.

The alignment system 170 mounts and aligns 940 the display housing to the lens housing via adjustment screws. The display alignment system 185 mates the display housing to the lens housing via two or more adjustment crews that are adjustable to align the display relative to the first lens and second lens in z along the optical axis and in tip/tilt. The display alignment system 185 includes a plurality of optical alignment cameras each pointed at the display through the second lens and the first lens at various field angles or angles relative to the optical axis of the second lens and the first lens. Accordingly, the display of the HMD is powered on to display a test image and the plurality of optical alignment cameras are each focused on the test/test image at approximately 2.5 m. The display is then adjusted along the z-axis and in tip and tilt to achieve equal focus across the display using the plurality of optical alignment cameras. The adjustments along z-axis and in tip and tilt are performed using the two or more adjustment crews. Adjustments in tip and tilt can be made by changing the angle between the lens housing and display housing via the compression foam by tightening one adjustment crew more relative to the other two adjustment screws, for example. Once adjustment of the display housing is complete, a ultra violet (UV) cure or other adhesive may be applied to fix the adjustment screws into place.

FIG. 9B is another flowchart illustrating a process 950 for actively aligning a pancake lens display assembly, in accordance with one embodiment. The process 950 of FIG. 9B may be performed by the components of an apparatus, e.g., the vision system 175, the polarization alignment system 180, the display alignment system 185. Likewise, embodiments may include different and/or additional steps, or perform the steps in different orders.

The alignment system 100 mounts 955 a second lens to a lens housing of the HMD. In one embodiment, this includes aligning a nose cut of the second lens to the corresponding nose cut outline of the lens housing, moving the second lens into place, and applying pressure between the second lens and adhesive on the lens housing to bond the second lens to the lens housing.

The alignment system 170 positions 960 a first lens in optical series with the second lens. The first lens includes a partially reflective coating (e.g., a 50/50 mirror) on a first surface and a quarter-waveplate (QWP) on a second surface and the first lens includes a reflective polarizer on a first surface. As above, the partially reflective coating and the QWP can be different layers stacked together on either the first or second surfaces of the first lens and the reflective polarizer can also be on either the first surface or a second surface of the second lens in different embodiments. The second lens is mounted to a lens housing and the first lens is positioned in optical series with the first lens using the polarization alignment system 180 configured to rotate the first lens along an optical axis of the pancake lens display assembly.

The alignment system 170 directs 965 linearly polarized light through the second lens and then through the first lens to a circular polarimeter (e.g., a stokes snapshot polarimeter). The QWP of the first lens substantially converts the linearly polarized light to circularly polarized light as the linearly polarized light travels through the QWP to the partially reflective coating.

The alignment system 170 rotates 970 the first lens through a range of angles along the optical axis. While rotating, the alignment system 170 determines 975 the angle where the amount of circularly polarized light received by circular polarimeter is above a threshold intensity relative to other angles in the range of angles. Additionally, at this angle, a first orientation axis of the QWP on the first lens is positioned relative to a second orientation axis of the reflective polarizer on the second lens such that light transmitted through the second lens and then through the first lens is substantially circularly polarized.

The alignment system 170 mounts 980 the first lens to the lens housing at the determined angle. This includes the holding prongs moving the first lens at the identified angle into position to make contact between the first lens and an adhesive (e.g., pressure sensitive adhesive) and compression foam on the lens housing. In one embodiment, the polarization alignment system 180 is configured to generate pressure between the first lens and the adhesive and compression foam on the lens housing to mount the first lens to the lens housing.

The alignment system 170 mounts 985 the display of the HMD to a display housing. As above, this may include applying adhesive that is pressure sensitive to the display housing and guiding the display with the correct alignment into position on the display housing to adhere the display to the adhesive on the display housing.

The alignment system 170 mounts and aligns 990 the display housing to the lens housing. After the first lens is mounted to the lens housing, the display is rotated relative to the second lens and the first lens. In this embodiment, the display alignment system 185 includes a rotation stage, a display vacuum chuck, and a camera. The display vacuum chuck is configured to hold and position the display and display housing a distance from where the display housing will be mounted to the lens housing to allow the display housing to freely rotate. The display is configured to emit circularly polarized test light and is powered on to display a test image while the camera is focused on a straight pass through to a ghost image created by the test image, as observed from the eye-side of the pancake lens display assembly. The display housing is rotated through a range of angles to identify a position for the display where the brightness of the ghost image is less than a threshold value (or minimized relative to other angles though which the display is rotated). Once the angle where the brightness of the ghost image is less than a threshold value is identified, the display vacuum chuck moves the display housing into position in z until the display housing contacts compression foam of the lens housing and the one or more adjustment screws are rotated into place to attach the display housing. The display vacuum chuck then releases the display.

A Head Mounted Display (HMD)

Figure 10:
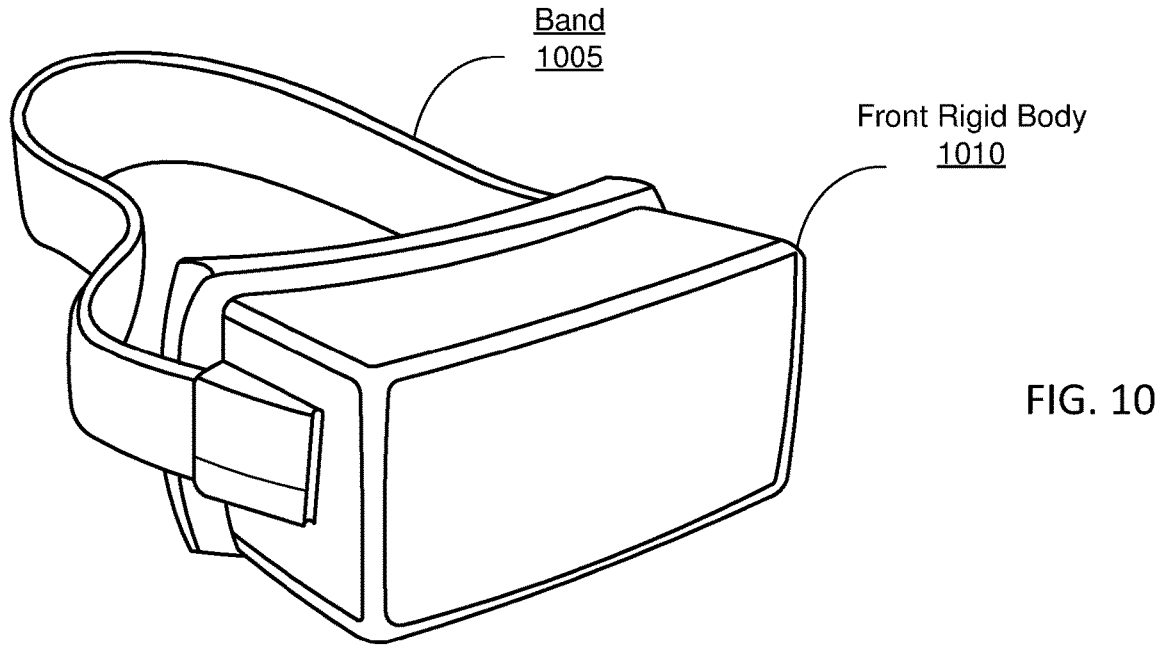
FIG. 10 is a diagram of a HMD, in accordance with one embodiment.

FIG. 10 is a diagram of a HMD 1000, in accordance with one embodiment. The HMD 1000 can be a Virtual reality (VR) headset that presents media to a user. Alternatively, the HMD 1000 may be part of some other augmented reality, virtual reality, or mixed reality system. Examples of media presented by the HMD 1000 include one or more images, video, audio, or some combination thereof. In some embodiments, audio is presented via an external device (e.g., speakers and/or headphones) that receives audio data based on the audio information. The HMD 1000 shown in FIG. 10 includes a band 1005 and a front rigid body 1010. The band 1005 is configured for users to wear the HMD 1000 on their head. The front rigid body 1010 includes one or more optical elements and display panels which together display media to users.

Figure 11:
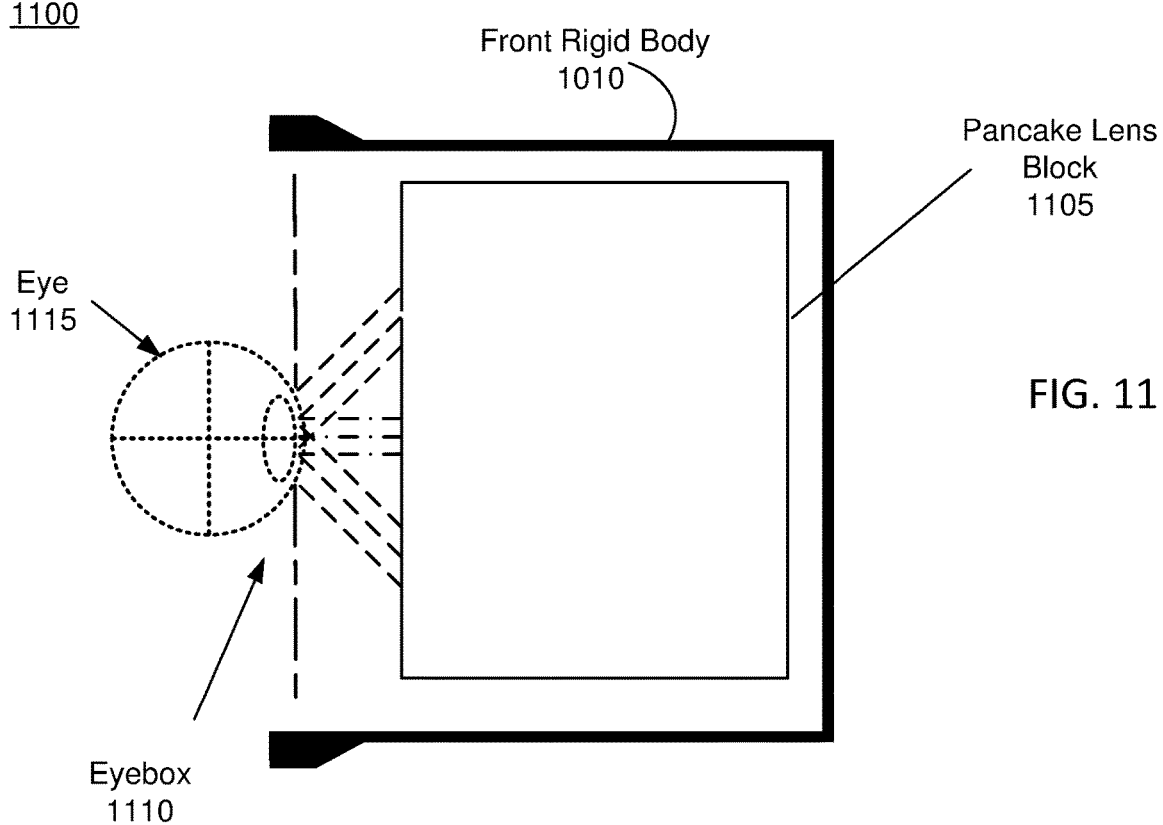
FIG. 11 is a cross section of a front rigid body of the HMD shown in FIG. 10, in accordance with one embodiment.

FIG. 11 is a cross section 1100 of the front rigid body 1010 of the HMD 1000 shown in FIG. 10, in accordance with one embodiment. In the embodiment of FIG. 11, the front rigid body 1010 includes a pancake display assembly 1105 that further includes a display and two or more optical elements that together provide image light to an eyebox 1110. In one embodiment, the pancake display assembly 1105 is the pancake lens display assembly 100. The eyebox 1110 is a location where a user's eye 1115 is positioned when the user wears the HMD 1000. For purposes of illustration, FIG. 11 shows a cross section associated with a single eye 1115 and with a single pancake display assembly 1105, and in alternative embodiments not shown, another pancake display assembly that is separate from the pancake display assembly 1105 shown in FIG. 11, provides image light to the other eye of the user.

System Overview

Figure 12:
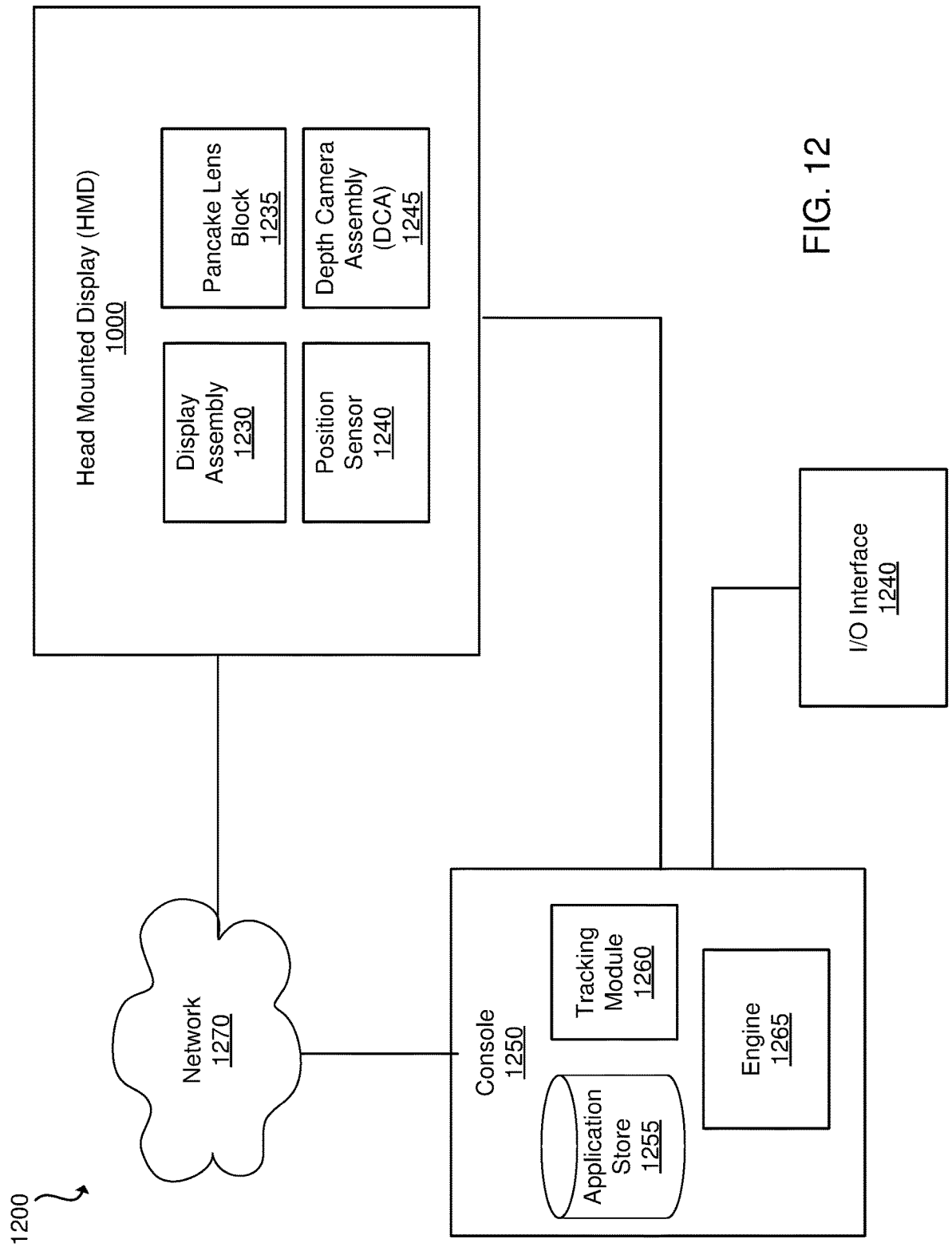
FIG. 12 is a system environment in which a HMD with a pancake lens operates, in accordance with at least one embodiment.

FIG. 12 is a system 1200 that includes a head mounted display (HMD) 1000, in accordance with one or more embodiments. The system 1200 may operate in an artificial reality environment (e.g., a virtual reality environment, an augmented reality environment, a mixed reality environment, or some combination thereof). The system 1200 shown by FIG. 12 includes the HMD 1000, an input/output (I/O) interface 1210 that is coupled to a console 1215, and the network 1220. While FIG. 12 shows an example system 1200 including one HMD 1000 and one I/O interface 1210, in other embodiments any number of these components may be included in the system 1200. For example, there may be multiple headsets each having an associated I/O interface 1210, with each headset and I/O interface 1210 communicating with the console 1215. In alternative configurations, different and/or additional components may be included in the system 1200. Additionally, functionality described in conjunction with one or more of the components shown in FIG. 12 may be distributed among the components in a different manner than described in conjunction with FIG. 12 in some embodiments. For example, some or all of the functionality of the console 1215 may be provided by the HMD 1000.

The HMD 1000 includes a display assembly 1230, a pancake lens block 1235, one or more position sensors 1240, and the DCA 1245. Some embodiments of HMD 1000 have different components than those described in conjunction with FIG. 12. Additionally, the functionality provided by various components described in conjunction with FIG. 12 may be differently distributed among the components of the HMD 1000 in other embodiments, or be captured in separate assemblies remote from the HMD 1000.

The display assembly 1230 displays content to the user in accordance with data received from the console 1215. The display assembly 1230 displays the content using one or more display elements (e.g., the display 505). A display element may be, e.g., an electronic display. In various embodiments, the display assembly 1230 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display 505 may also include some or all of the functionality of the pancake lens block 1235.

The pancake lens block 1235 is a pancake lens that magnifies image light received from the electronic display, corrects optical errors associated with the image light, and presents the corrected image light to one or both eyeboxes of the HMD 1000. In various embodiments, the pancake lens block 1235 includes one or more optical elements. Example optical elements included in the pancake lens block 1235 include: an aperture, a Fresnel lens, a convex lens, a concave lens, a filter, a reflecting surface, or any other suitable optical element that affects image light. Moreover, the pancake lens block 1235 may include combinations of different optical elements. In some embodiments, one or more of the optical elements in the pancake lens block 1235 may have one or more coatings, such as partially reflective or anti-reflective coatings.

Magnification and focusing of the image light by the pancake lens block 1235 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases all, of the user's field of view. Additionally, in some embodiments, the amount of magnification may be adjusted by adding or removing optical elements.

In some embodiments, the pancake lens block 1235 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the pancake lens block 1235 corrects the distortion when it receives image light from the electronic display generated based on the content.

The position sensor 1240 is an electronic device that generates data indicating a position of the HMD 1000. The position sensor 1240 generates one or more measurement signals in response to motion of the HMD 1000. The position sensor 190 is an embodiment of the position sensor 1240. Examples of a position sensor 1240 include: one or more IMUs, one or more accelerometers, one or more gyroscopes, one or more magnetometers, another suitable type of sensor that detects motion, or some combination thereof. The position sensor 1240 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the HMD 1000 from the sampled data. For example, the IMU integrates the measurement signals received from the accelerometers over time to estimate a velocity vector and integrates the velocity vector over time to determine an estimated position of a reference point on the HMD 1000. The reference point is a point that may be used to describe the position of the HMD 1000. While the reference point may generally be defined as a point in space, however, in practice the reference point is defined as a point within the HMD 1000.

The DCA 1245 generates depth information for a portion of the local area. The DCA includes one or more imaging devices and a DCA controller. The DCA 1245 may also include an illuminator. The DCA includes one or more imaging devices and a DCA controller, and may also include an illuminator. In some embodiments, the illuminator illuminates a portion of the local area with light. The light may be, e.g., structured light (e.g., dot pattern, bars, etc.) in the infrared (IR), IR flash for time-of-flight, etc. In some embodiments, the one or more imaging devices capture images of the portion of the local area that include the light from the illuminator 140. In alternate embodiments, there is no illuminator and at least two imaging devices. The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator), some other technique to determine depth of a scene, or some combination thereof.

The I/O interface 1210 is a device that allows a user to send action requests and receive responses from the console 1215. An action request is a request to perform a particular action. For example, an action request may be an instruction to start or end capture of image or video data, or an instruction to perform a particular action within an application. The I/O interface 1210 may include one or more input devices. Example input devices include: a keyboard, a mouse, a game controller, or any other suitable device for receiving action requests and communicating the action requests to the console 1215. An action request received by the I/O interface 1210 is communicated to the console 1215, which performs an action corresponding to the action request. In some embodiments, the I/O interface 1210 includes an IMU that captures calibration data indicating an estimated position of the I/O interface 1210 relative to an initial position of the I/O interface 1210. In some embodiments, the I/O interface 1210 may provide haptic feedback to the user in accordance with instructions received from the console 1215. For example, haptic feedback is provided when an action request is received, or the console 1215 communicates instructions to the I/O interface 1210 causing the I/O interface 1210 to generate haptic feedback when the console 1215 performs an action.

The console 1215 provides content to the HMD 1000 for processing in accordance with information received from one or more of: the DCA 1245, the HMD 1000, and the I/O interface 1210. In the example shown in FIG. 12, the console 1215 includes an application store 1255, a tracking module 1260, and an engine 1265. Some embodiments of the console 1215 have different modules or components than those described in conjunction with FIG. 12. Similarly, the functions further described below may be distributed among components of the console 1215 in a different manner than described in conjunction with FIG. 12. In some embodiments, the functionality discussed herein with respect to the console 1215 may be implemented in the HMD 1000, or a remote system.

The application store 1255 stores one or more applications for execution by the console 1215. An application is a group of instructions, that when executed by a processor, generates content for presentation to the user. Content generated by an application may be in response to inputs received from the user via movement of the HMD 1000 or the I/O interface 1210. Examples of applications include: gaming applications, conferencing applications, video playback applications, or other suitable applications.

The tracking module 1260 tracks movements of the HMD 1000 or of the I/O interface 1210 using information from the DCA 1245, the one or more position sensors 1240, or some combination thereof. For example, the tracking module 1260 determines a position of a reference point of the HMD 1000 in a mapping of a local area based on information from the HMD 1000. The tracking module 1260 may also determine positions of an object or virtual object. Additionally, in some embodiments, the tracking module 1260 may use portions of data indicating a position of the HMD 1000 from the position sensor 1240 as well as representations of the local area from the DCA 1245 to predict a future location of the HMD 1000. The tracking module 1260 provides the estimated or predicted future position of the HMD 1000 or the I/O interface 1210 to the engine 1265.

The engine 1265 executes applications and receives position information, acceleration information, velocity information, predicted future positions, or some combination thereof, of the HMD 1000 from the tracking module 1260. Based on the received information, the engine 1265 determines content to provide to the HMD 1000 for presentation to the user. For example, if the received information indicates that the user has looked to the left, the engine 1265 generates content for the HMD 1000 that mirrors the user's movement in a virtual local area or in a local area augmenting the local area with additional content. Additionally, the engine 1265 performs an action within an application executing on the console 1215 in response to an action request received from the I/O interface 1210 and provides feedback to the user that the action was performed. The provided feedback may be visual or audible feedback via the HMD 1000 or haptic feedback via the I/O interface 1210.

The network 1220 couples the HMD 1000 and/or the console 1215 to the mapping server 1225. The network 1220 may include any combination of local area and/or wide area networks using both wireless and/or wired communication systems. For example, the network 1220 may include the Internet, as well as mobile telephone networks. In one embodiment, the network 1220 uses standard communications technologies and/or protocols. Hence, the network 1220 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 1220 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 1220 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
    positioning a first lens of a display assembly, the first lens in optical series with a second lens that is coupled to a lens housing;
    rotating, using an alignment system, the first lens about an optical axis of a pancake lens display assembly to position a first orientation axis of a quarter-wave plate on the first lens such that the first orientation axis is at an angle relative to a second orientation axis of a reflective polarizer on the second lens, wherein the angle is such that light transmitted through the second lens and then through the first lens is substantially circularly polarized; and
    mounting the first lens to the lens housing, wherein the first lens is mounted to the lens housing such that the quarter-wave plate is at the angle relative to the reflective polarizer.

2. The method of claim 1, wherein rotating the first lens about the optical axis of the pancake lens display assembly to position the first orientation axis of the quarter-wave plate on the first lens such that the first orientation axis is at the angle relative to the second orientation axis of the reflective polarizer on the second lens, further comprises:
    directing test light through the first lens, wherein a portion of the directed test light is transmitted by the reflective polarizer of the second lens to a camera,
    imaging, using the camera, the portion of the directed test light, wherein the portion of the directed test light forms a ghost image, wherein the angle is such that a brightness of the ghost image is less than a threshold value.

3. The method of claim 2, wherein the test light is directed through the first lens from an illumination source, wherein the illumination source is a chrome-on glass target or a display of the pancake lens display assembly.

4. The method of claim 2, wherein an illumination source of the test light includes a film stack configured to emit circularly polarized test light, wherein the circularly polarized test light passes through the quarter-wave plate of the first lens, the quarter-wave plate changes the circularly polarized test light to linearly polarized test light that allows at least a portion of the linearly polarized test light to pass through the reflective polarizer of the second lens to be imaged by the camera as the ghost image.

5. The method of claim 1, wherein rotating the first lens about the optical axis of the pancake lens display assembly to position the first orientation axis of the quarter-wave plate on the first lens such that the first orientation axis is at the angle relative to the second orientation axis of the reflective polarizer on the second lens, further comprises:
    directing, from an illumination source, test light through the second lens such that the test light then is transmitted by the first lens to a stokes snapshot polarimeter; and
    determining an amount of circularly polarized light in the test light using the stokes snapshot polarimeter, wherein the angle is such that an amount of circular polarized light received at the stokes snapshot polarimeter is at least some threshold value.

6. The method of claim 5, further comprising:
    positioning, using a rotation stage, an electronic display of the pancake lens display assembly in optical series with the first lens and the second lens, the electronic display configured to emit circularly polarized light;
    displaying a test image on the electronic display, wherein a camera is focused on the optical axis at the electronic display with the first lens and the second lens between the camera and the electronic display, wherein a portion of the circularly polarized light from the electronic display forms a ghost image at the camera;
    rotating, via the rotation stage, the electronic display through a range of angles;
    determining an angle of the electronic display such that a brightness of the ghost image is less than a threshold value.

7. The method of claim 1, wherein positioning the first lens in optical series with the second lens comprises:
    mounting the second lens to the lens housing; and
    positioning the first lens a predetermined distance from a mounting location for the first lens on the lens housing.

8. The method of claim 1, further comprising:
    applying pressure sensitive adhesive between the first lens and the lens housing; and
    generating, using the alignment system, pressure on the pressure sensitive adhesive between the first lens and the lens housing to mount the first lens to the lens housing.

9. The method of claim 1, further comprising:
    applying pressure sensitive adhesive between an electronic display and a display housing;
    determining alignment of the electronic display on the display housing; and
    mounting the electronic display to the display housing via the pressure sensitive adhesive.

10. The method of claim 9, further comprising:
    attaching the display housing to the lens housing;
    display a test image on the electronic display viewable through the first lens and the second lens by a plurality of optical alignment cameras each covering a different field angle; and
    adjusting the electronic display along at least one of the optical axis, tip, and tilt based on images from plurality of optical alignment cameras.

11. A system comprising:
    a central mount;
    a rotating collar connected to the central mount and configured to rotate about the central mount;
    two or more holding prongs attached to the rotating collar, the two or more holding prongs configured to hold a first lens while the rotating collar rotates the first lens about an optical axis of a pancake lens display assembly including a second lens in optical series with the first lens, wherein the rotating collar rotates the first lens to position a first orientation axis of a quarter-wave plate on the first lens such that the first orientation axis is at an angle relative to a second orientation axis of a reflective polarizer on the second lens;
an illumination source configured to emit test light through the first lens and the second lens; and
a sensor configured to receive the test light emitted by the illumination source, wherein the angle is such that light transmitted through the second lens and then through the first lens is substantially circularly polarized.

12. The system of claim 11, wherein the illumination source is coupled to the mount and further configured to emit circularly polarized test light through the first lens and then through the second lens, wherein the circularly polarized test light passing through the first lens and then through the second lens is imaged by the sensor as a ghost image, and wherein the angle is such that a brightness of the ghost image is less than a threshold value.

13. The system of claim 12, wherein the circularly polarized test light from the illumination source passes through the quarter-wave plate of the first lens, the quarter-wave plate changes the circularly polarized test light to linearly polarized test light that allows at least a portion of the linearly polarized test light to pass through the reflective polarizer of the second lens to be imaged by the sensor as the ghost image.

14. The system of claim 12, wherein the illumination source is a chrome-on glass target or a display of the pancake lens display assembly.

15. The system of claim 11, wherein the sensor is a stokes snapshot polarimeter configured to receive the light emitted from the illumination source after the light passes through the second lens and then through the first lens, wherein the illumination source is further configured to emit linearly polarized light through the second lens and then through the first lens to the stokes snapshot polarimeter, wherein the rotating collar is further configured to rotate the first lens through a range of angles to determine the angle where an amount of circular polarized light received at the stokes snapshot polarimeter is at least some threshold value.

16. The system of claim 15, further comprising:
a display alignment system including a camera and a rotation stage, the display alignment system configured to:
position, using the rotation stage, an electronic display of the pancake lens display assembly in optical series with the first lens and the second lens, the electronic display configured to emit circularly polarized light;
cause a test image to be displayed on the electronic display, wherein the camera is focused on the optical axis at the electronic display with the first lens and the second lens between the camera and the electronic display, wherein a portion of the circularly polarized light from the electronic display forms a ghost image at the camera; and
determine, by rotating the electronic display through a range of angles using the rotation stage, an angle of the electronic display where a brightness of the ghost image is less than a threshold value.

17. The system of claim 16, further comprising:
a vision system configured to:
generate pressure between the first lens and pressure sensitive adhesive on the lens housing to mount the first lens to the lens housing.

18. The system of claim 11, further comprising:
a display alignment system comprising a plurality of optical alignment cameras, wherein the display alignment system is configured to:
mount an electronic display to a display housing;
mount the display housing to the lens housing;
cause a test image to be displayed on the electronic display viewable by the plurality of optical alignment cameras each covering a different field angle; and
adjust the electronic display in at least one of along the optical axis, tip, and tilt based on images from plurality of optical alignment cameras.

19. The system of claim 18, wherein the display housing is mounted to the lens housing via two or more adjustable screws, and wherein the adjustment in at least one of along the optical axis, tip, and tilt is made by adjusting the two or more adjustable screws.

20. The method of claim 18, wherein the display housing is mounted to the lens housing via an adhesive, and the adjustment in at least one of along the optical axis, tip, and tilt is made using the display alignment system before the adhesive cures.

* * * * *